United States Patent [19]

Scheer

[11] Patent Number: 4,610,342
[45] Date of Patent: Sep. 9, 1986

[54] CLUTCH FOR MOTOR VEHICLES

[75] Inventor: Erich Scheer, Prosselsheim, Fed. Rep. of Germany

[73] Assignee: Fichtel & Sachs AG, Schweinfurt, Fed. Rep. of Germany

[21] Appl. No.: 637,897

[22] Filed: Aug. 6, 1984

[30] Foreign Application Priority Data

Aug. 11, 1983 [DE] Fed. Rep. of Germany ....... 3329039

[51] Int. Cl.⁴ ............................................. F16D 13/71
[52] U.S. Cl. ............................ 192/70.28; 192/89 B; 192/98; 192/109 A
[58] Field of Search ............... 192/109 A, 70.2, 70.19, 192/70.21, 70.27, 70.28, 98, 89 B

[56] References Cited

U.S. PATENT DOCUMENTS

| | | | |
|---|---|---|---|
| 3,739,896 | 6/1973 | Shono | 192/89 B X |
| 3,770,088 | 11/1973 | Shono | 192/70.27 |
| 3,910,392 | 10/1975 | Foers | 192/70.28 X |
| 4,317,435 | 3/1982 | Kohlhage | 192/70.27 X |
| 4,410,074 | 10/1983 | Maucher et al. | 192/70.27 |

FOREIGN PATENT DOCUMENTS

| | | |
|---|---|---|
| 1555408 | 9/1971 | Fed. Rep. of Germany . |
| 2647703 | 4/1977 | Fed. Rep. of Germany . |
| 965780 | 8/1964 | United Kingdom . |
| 2098287 | 11/1982 | United Kingdom ............... 192/89 B |

Primary Examiner—George H. Krizmanich
Attorney, Agent, or Firm—Toren, McGeady, Stanger, Goldberg & Kiel

[57] ABSTRACT

In a pressed-type clutch for a motor vehicle the clutch disc with its friction linings is located axially between a pressure plate which is nearer to the driving disc and an anti-pressure plate which is more remote from the driving disc. The pressure plate is axially movable with respect to the driving disc and connected therewith for common rotation. The anti-pressure plate is stationary with respect to the driving disc. A spring force transmitting structure is fixed to the pressure plate and has a bottom on the side of the anti-pressure plate which is remote from the driving disc. A diaphragm spring is located between the anti-pressure plate and the bottom of the spring force transmitting structure. The clutch release bearing is moved into engagement with the tongues of the diaphragm spring and towards the driving disc in view of clutch disengagement.

8 Claims, 1 Drawing Figure

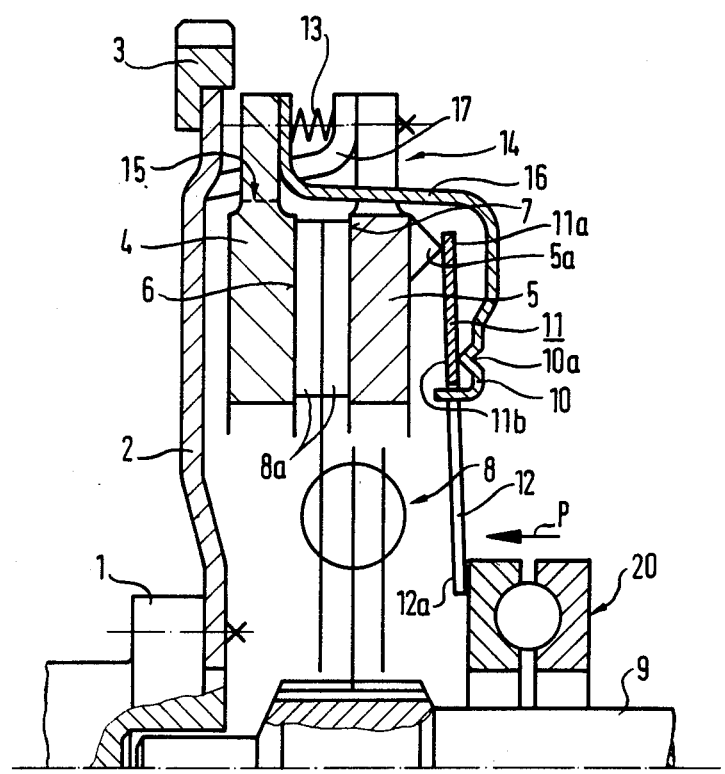

CLUTCH FOR MOTOR VEHICLES

BACKGROUND OF THE INVENTION

This invention relates to a clutch disc unit such as used in motor vehicles in the torque transmission path between a motor and a gear box. In such a clutch disc unit the clutch engagement force is exerted by a diaphragm spring and clutch disengagement is caused by axial movement of the tongues of the diaphragm spring by an axially movable clutch release unit. In view of easily assembling the motor and the gear box with the clutch unit therebetween, it is desirable that the clutch release unit has to exert only a pressure onto the tongues of the diaphragm spring and no pulling force such that no positive connection is necessary between the clutch release unit and the radially inner end of the diaphragm spring tongues.

STATEMENT OF THE PRIOR ART

From German Pat. No. 1,155,408 a pulled-type clutch unit is known. This known construction comprises a driving disc and a clutch housing with a cover portion axially spaced from the driving disc. Between the driving disc and the cover portion of the clutch housing there are located axially one beside the other the clutch disc nearer to the driving disc and the pressure plate nearer to the cover portion. A diaphragm spring is supported by its radially outer zone on the cover portion and by its radially intermediate zone by the pressure plate. The clutch release unit is axially fixed to the radially inner ends of the tongues of the diaphragm spring. This known clutch unit is desirable in view of the simple arrangement of the diaphragm spring between the cover portion and the pressure plate, according to which the pressure plate always acts on the same supporting zones of the cover portion and the pressure plate in the engaged condition and on disengagement operation. On the other hand, this known clutch unit has the disadvantage that the clutch release unit must be positively connected to the radially inner ends of the diaphragm spring tongues. This is not only tedious in assembling of the clutch unit, it is still more unpleasant because in assembling the motor, on the one hand, and the gear box, on the other hand, with the clutch unit therebetween, a pull force transmitting connection is to be established between those parts of the clutch release unit preassembled with the diaphragm spring and those parts preassembled with gear box.

From German 'Offenlegungsschrift' No. 2,647,703 another clutch unit is known, namely a pressed-type clutch unit. This pressed-type clutch unit comprises a driving disc and a clutch housing fixed thereto with said clutch housing including a bottom portion axially spaced from said driving disc. A clutch disc and a pressure plate are located axially one beside the other between the driving disc and the bottom portion, the clutch disc being nearer to the driving disc and the pressure plate being nearer to the bottom portion. A diaphragm spring is located axially between the pressure plate and the bottom portion. This diaphragm spring has a radially outer zone in engagement with the pressure plate and a radially intermediate zone which is pivotally mounted on the bottom portion about a plurality of pivot axes which are tangential with respect to the axis of the clutch unit. The clutch release unit is pressed against the radially inner ends of the clutch spring tongues in view of disengagement of the clutch unit in being pressed towards the driving disc. In the engaged condition the diaphragm spring is supported by the bottom portion of the clutch housing. When the clutch release unit is moved towards the driving disc in view of disengagement of the clutch unit, the radially intermediate zone of the diaphragm spring is lifted from the bottom portion and pivoted about a support ring borne by the bottom portion through the slots of the diaphragm spring. Each time the clutch unit performs a cycle of disengagement and reengagement, a change occurs from spring support by the bottom portion to spring support by the support ring and vice versa. This change results in wear of the diaphragm spring, on the one hand, and the support faces of the bottom portion and the support ring, on the other hand. This wear results in an increasing clutch disengagement path of the clutch release unit becoming necessary. Therefore, also this known type of clutch unit does not fully fulfil the requirements of the practice in spite of the easy pressed-type engagement between the clutch release unit and the radially inner ends of the diaphragm spring tongues.

OBJECT OF THE INVENTION

It is an object of the present invention to have a clutch unit which combines the advantages of the above discussed two known types of clutch units and avoids the disadvantages thereof. More particularly, it is an object of this invention to provide a clutch unit, in which disengagement is obtained by simply pressing the clutch release unit against the radially inner ends of the diaphragm spring tongues, i. e. movement of the clutch release unit towards the driving disc and, on the other hand, to support the diaphragm spring between the clutch housing and the pressure plate such that the diaphragm spring is always engaged on the same side.

SUMMARY OF THE INVENTION

A clutch unit comprises a driving disc having an axis. A first friction face is stationary with respect to the driving disc and is substantially perpendicular with respect to the axis. A pressure plate is mounted for common rotation with the driving disc and for axial movement with respect to the driving disc. The pressure plate has a second friction face substantially perpendicular to the axis and facing the first friction face. A clutch disc is frictionally engageable with the first and the second friction faces. A diaphragm spring urges the pressure plate with the second friction face towards the first friction face such as to maintain frictional engagement between the clutch disc, on the one hand, and the first and second friction faces, on the other hand. The diaphragm spring has radially inwardly directed tongues. A clutch release unit is axially enageable with the radially inwardly directed tongues in view of disengaging the clutch disc from frictional engagement with the first and second friction faces.

The first friction face is provided on an anti-pressure plate axially spaced from said driving disc. The pressure plate is located axially between the driving disc and the anti-pressure plate. A spring force transmitting structure is fastened to the pressure plate and has at least one substantially axially directed portion extending across the anti-pressure plate adjacent the radially outer periphery thereof and a cover portion extending substantially radially inwardly from the axially extending portion on the side of said anti-pressure plate which is remote from said first friction face. The diaphragm spring is located axially between the anti-pressure plate and the cover portion and has a radially outer zone engaging the anti-pressure plate and a radially intermediate zone axially engaging the cover portion. The clutch release unit acts onto the radially inwardly directed tongues of the diaphragm spring on the side thereof remote from the driving disc. Movement of the clutch release unit towards the driving disc effects disengagement of the clutch disc from frictional engagement with the first and second friction faces.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be explained in greater detail below by reference to an example of embodiment. In detail:

The FIGURE shows a longitudinal section through a diaphragm structure incorporating the features of this invention.

DESCRIPTION OF THE PREFERRED EMBODIMENT

The crank shaft 1 of the internal combustion engine is connected in the usual way with a driving disc 2 which carries the starter ring 3 on its external circumference. At a distance from the driving disc 2, in the direction towards the gear box (not shown), an anti-pressure pressure plate 5 is fixedly arranged. It is connected with the driving disc 2 through a plurality of straps 17 distributed on the circumference. Between the anti-pressure plate 5 and the driving disc 2 there is arranged a pressure plate 4 which possesses recesses 15 on the external circumference through which the straps 17 extend. The pressure plate 4 is connected with a spring force transmitting structure 10, 16, straps 16 of which penetrate through recesses 14 of the anti-pressure plate 5. The cover portion 10 of this structure is situated on the side of the anti-pressure plate 5 remote from the pressure plate 4. Between the cover portion 10 and the anti-pressure plate 5 there is arranged the diaphragm spring 11, the tongues 12 of which are directed radially inwards. The diaphragm spring 11 is supported by its radial outer zone 11a on the anti-pressure plate 5 and with its radial intermediate zone 11b on the cover portion 10. Between the two friction faces 6 and 7 of the pressure plate 4 and the anti-pressure plate 5, respectively, there are arranged the friction linings 8a of the clutch disc 8 which is mounted fast in rotation but axially displaceably on an input shaft 9 of the gear box (not shown). In the region radially outside the friction faces 6 and 7 there are situated firstly the straps 16 and 17, staggered in the circumferential direction, which penetrate the recesses 14 and 15, respectively, and release springs 13 which in the uncoupled condition of the friction clutch keep the friction faces 6 and 7 apart.

The manner of operation of the friction clutch as illustrated is as follows: in the drawing there is reproduced the engaged condition. For the release of the clutch the clutch release unit 20 is brought to abut on the diaphragm spring tongues 12 and exerts a force in the direction of the arrow P upon these. If this force overcomes the initial stress force of the diaphragm spring 11, then the latter pivots about its abutment 5a on the anti-pressure plate 5 in the direction towards the driving disc 2, whereby the cover portion 10 is relieved. Since the cover portion 10 is firmly connected through the straps 16 with the pressure plate 4, the latter is also relieved of load and the clutch disc 8 can move freely in the circumferential direction between the anti-pressure plate 5, arranged axially fast on the driving disc 2, and the pressure plate 4. The operation of engaging the clutch proceeds in the opposite direction.

The arrangement of the diaphragm spring 10 takes place in the present case in principle in conformity with a conventional pulled clutch. This signifies that the diaphragm spring 11 can be pivoted about its radially outer support point 5a during the engagement and disengagement of the clutch. In its radially intermediate zone 11b it acts upon the pressure plate 4 through the spring force transmitting structure 10, 16. This construction avoids the enlargement of the release path in the case of wear between the diaphragm spring 11 and its abutment points 5a, 10a. Moreover, the clutch can be actuated in the most desired manner, that is by pressing of the clutch release unit 20 upon the spring tongue ends 12a in the direction towards the driving disc 2. This brings the advantage that the motor and the gear box of the respective vehicle can very easily be separated and also connected together again, since no fixed connection has to be provided between the clutch release unit 20 and the spring tongues 12. Modifications of the vehicle are not necessary if a former pressed clutch is to be replaced by this new system.

While a specific embodiment of the invention has been shown and described in detail to illustrate the application of the inventive principles, it will be understood, that the invention may be embodied otherwise without departing from such principles.

What is claimed is:

1. A clutch unit such as for motor vehicles, comprising
    a driving disc (2) having an axis;
    a first friction face (7) stationary with respect to said driving disc (2) and substattially perpendicular with respect to said axis;
    a pressure plate (4) mounted for common rotation with said driving disc (2) and for axial movement with respect thereto and having a second friction face (6) substantially perpendicular to said axis and facing said first friction face (7);
    a clutch disc (8) frictionally engageable with said first and said second friction faces (7, 6);
    a diaphragm spring (11) urging said pressure plate (4) with said second friction face (6) towards said first friction face (7) such as to maintain frictional engagement between said clutch disc (8) and said first and said second friction faces (7, 6), said diaphragm spring (11) having radially inwardly directed tongues (12);
    a clutch release unit (20) axially engageable with said radially inwardly directed tongues (12) in view of disengaging said clutch disc (8) from frictional engagement with said first and second friction faces (7, 6);
    said first friction face (7) being provided on an anti-pressure plate (5) axially spaced from said driving disc (2);
    said pressure plate (4) being located axially between said driving disc (2) and said anti-pressure plate (5);

a spring force transmitting structure (16, 10) being fastened to said pressure plate (4) and having at least one substantially axially directed portion (16) extending across said anti-pressure plate (5) adjacent the radially outer periphery thereof and a cover portion (10) extending substantially radially inwardly from said axially extending portion (16) on the side of said anti-pressure plate (5) which is remote from said first friction face (7);

said diaphragm spring (11) being located axially between said anti-pressure plate (5) and said cover portion (10) and having a radially outer zone (11a) axially engaging said anti-pressure plate (5) and a radially intermediate zone (11b) axially engaging said cover portion (10);

said clutch release unit (20) acting on said radially inwardly directed tongues (12) of daid diaphrgm spring (11) on the side thereof remote from said driving disc (2), movement of said clutch release unit (20) towards said driving disc (2) effecting disengagement of said clutch disc (8) from said frictional engagement with said first and second friction faces (7, 6); and clutch release spring means (13) being provided for lifting said pressure plate (4) away from said anti-pressure plate (5) towards said driving disc (2) in response to axial movement of said clutch release unit (20) towards said driving disc (2), said clutch release spring means (13) being free of diaphragm spring supporting forces when said clutch release unit (20) acts onto said radially inwardly directed tongues (12) of said diaphragm spring.

2. A clutch unit as set forth in claim 1, said driving disc (2) being fastened to an end portion of a crankshaft (1) of a driving motor.

3. A clutch unit as set forth in claim 1, said clutch disc (8) being mounted on an input shaft (9) of a gear box for common rotation therewith and for axial movement with respect thereto.

4. A clutch unit as set forth in claim 1, said anti-pressure plate (5) being fastened to said driving disc (2) by substantially axially extending straps (17).

5. A clutch unit as set forth in claim 4, said straps (17) being received by recesses (15) of said pressure plate (4) adjacent the radially outer periphery thereof, said straps (17) and said recesses (15) interconnecting said pressure plate (4) and said driving disc (2) for common rotation.

6. A clutch unit as set forth in claim 1, said at least one axially extending portion (16) extending through a recess (14) of said anti-pressure plate (5) provided at the radially outer edge thereof.

7. A clutch unit as set forth in claim 1, said clutch release spring means (13) being located radially outwards of said axially extending portion (16) of said spring force transmitting structure (16, 10).

8. A clutch unit as set forth in claim 4, said clutch release spring means (13) being axially supported by a radially outwardly directed portion of said straps (17) and a radially outwardly directed portion of said force transmitting structure (16, 10).

* * * * *